Nov. 9, 1937.  R. B. SIMNING  2,098,523

SPRAY DEVICE

Filed April 16, 1936  2 Sheets-Sheet 1

Inventor:
R. B. Simning.
By G. H. Braddock
Attorney.

Nov. 9, 1937.  R. B. SIMNING  2,098,523
SPRAY DEVICE
Filed April 16, 1936  2 Sheets-Sheet 2
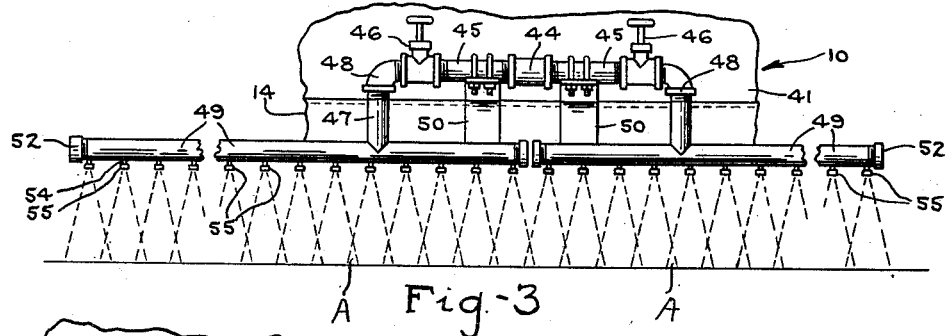
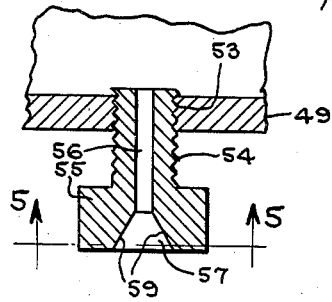
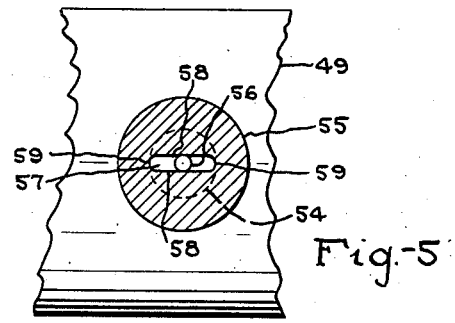
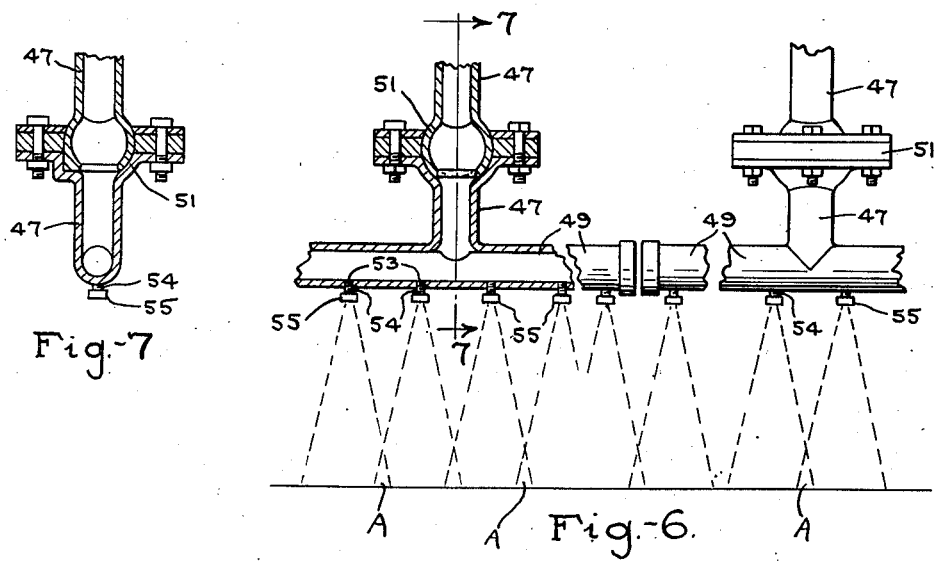
Inventor:
R. B. Simning.
By G. H. Braddock
Attorney.

Patented Nov. 9, 1937

2,098,523

UNITED STATES PATENT OFFICE 2,098,523

SPRAY DEVICE

Roy B. Simning, Minneapolis, Minn., assignor, by mesne assignments, to himself and Harold J. Murphy, St. Louis Park, Minneapolis, Minn., and George Verne Watson, Minneapolis, Minn.

Application April 16, 1936, Serial No. 74,652

1 Claim. (Cl. 299—34)

This invention relates to a spray device for applying oil or other liquid to highways, commonly called a spray bar.

An object of the invention is to provide a spray device or bar of the type as stated which will include novel and improved features and characteristics of construction.

A further object is to provide a spray device or bar for use in connection with a tank vehicle to apply oil or other liquid to highways, and which spray device or bar will be mounted or arranged to constantly maintain parallel relation to the surface as said vehicle advances over a highway.

And a further object is to provide in a tank vehicle for transporting a liquid, a spray device or bar associated with the tank of said vehicle as the medium for applying the liquid to a highway, which spray device or bar will be mounted or arranged to have substantially constant parallel relation to the surface adjacent said vehicle while the vehicle is traveling along and will incorporate unique and improved structure designed with the end in view of evenly and uniformly distributing or spreading the liquid over the highway.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claim which follows.

In the accompanying drawings forming a part of this specification,

Fig. 3 is a rear elevational view of the spray devices or bars of Figs. 1 and 2, disclosing a fragment of the tank vehicle;

Fig. 4 is an enlarged vertical, longitudinal sectional view, taken as on line 4—4 in Fig. 1, of either spray device or bar, detailing any one of the duplicate nozzles of each spray device or bar;

Fig. 5 is a horizontal sectional view, taken as on line 5—5 in Fig. 4, further detailing any nozzle;

Figure 1:
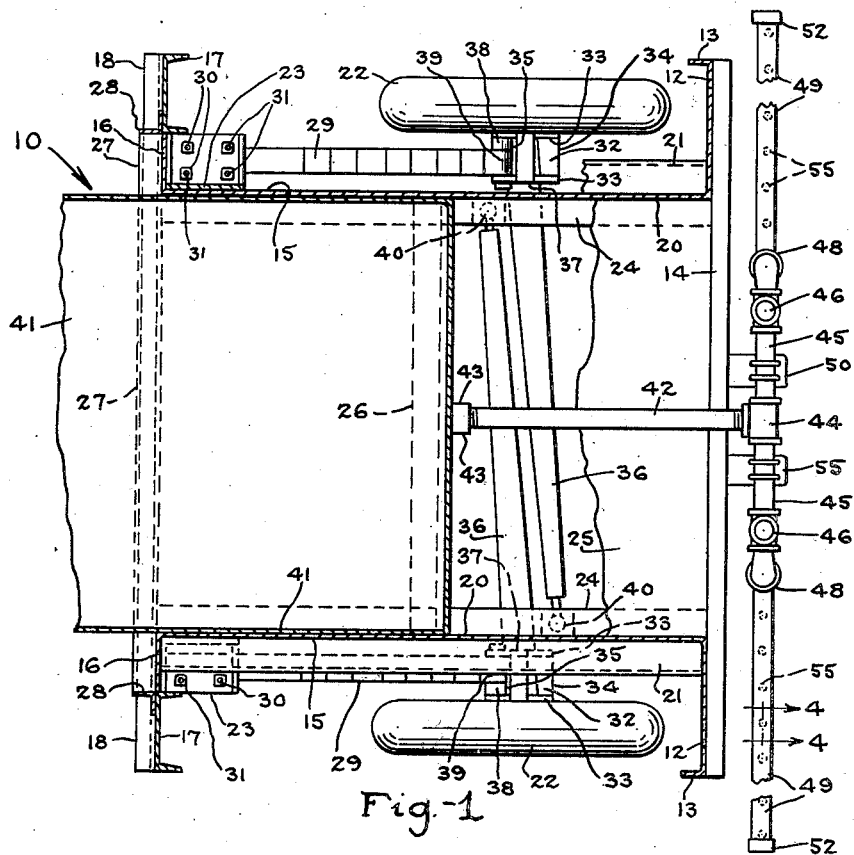
Fig. 1 is a fragmentary plan view, partially in section and partially broken away, disclosing the rearward portion of a tank vehicle and spray devices or bars on the vehicle including the features of the invention.
Figure 2:
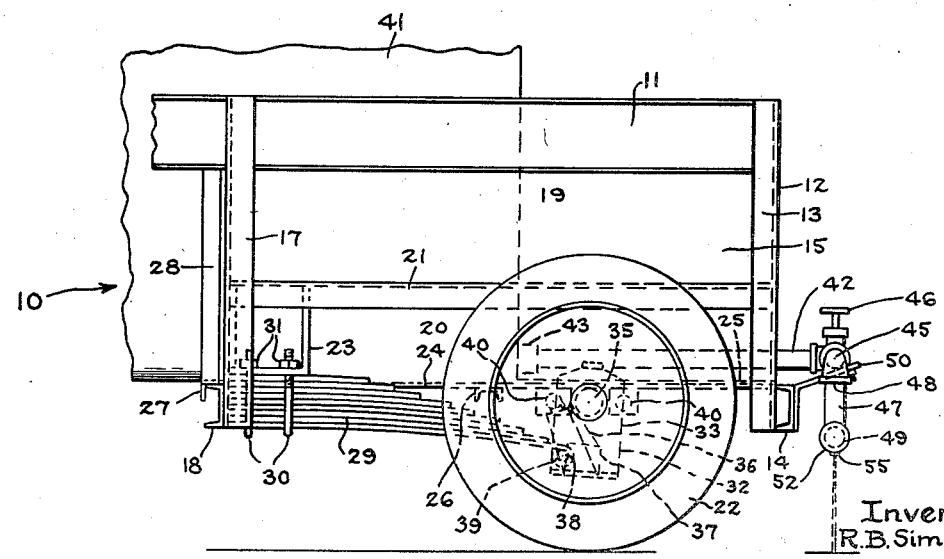
Fig. 2 is a side elevational view of the disclosure of Fig. 1.

Fig. 6 is a fragmentary view, partially in vertical, longitudinal section and partially in elevation, of spray devices or bars otherwise substantially similar to the spray devices or bars of Figs. 1 to 3 but incorporating self-adjusting means for each spray device or bar; and Fig. 7 is a detail sectional view, taken as on line 7—7 in Fig. 6, of either of said self-adjusting means for the spray devices or bars.

With respect to the drawings and the numerals of reference thereon, 10 denotes a tank vehicle the frame of which may include longitudinally extending, horizontally disposed main channel bars 11, including a main channel bar at either side of the frame. Only the rearward portion of one of said main channel bars is disclosed. The forward and rearward portions of the main channel bars 11 are integrally connected to each other by transverse reinforcing and strengthening members (not shown).

Vertical plates 12, one at either corner of the vehicle, are welded to the rearward ends of the main channel bars 11 and extend downwardly below the elevation of said main channel bars, say to about the elevation of the wheel centers. The vertical plates 12 are in spaced apart relation to each other, the outer vertical edge of each plate 12 is situated at the outer side of the adjacent main channel bar 11 in slightly spaced relation thereto, and the inner vertical edge of each plate 12 is situated at the inner side of the adjacent main channel bar in slightly spaced relation thereto. The outer portion of each vertical plate 12 as disclosed integrally supports a narrow flange 13 arranged perpendicular to the plate and extending forwardly of the vehicle. A flange 13 is adjacent each wheel as illustrated, at the outer side of the wheel.

A transversely extending channel bar 14 at the rear of the vehicle is disposed horizontally and has its opposite end portions welded to the rearward surfaces of the oppositely disposed vertical plates 12. Said channel bar 14 is at the elevation of the lower extremities of said vertical plates 12. As shown, the upper ends of the vertical plates 12 terminate in about the horizontal plane of the upper flanges of the main channel bars 11.

Rear wheel housings for the vehicle are denoted 15, there being a wheel housing 15 at each side of a rearward portion of the vehicle. As disclosed the wheel housings extend downwardly and inwardly from the main channel bars 11, and are interconnected by transverse structure, including the channel bar 14, at the elevation of lower portions of the vertical plates 12. A vertical plate 12 is directly at the rear of each wheel housing 15, and said vertical plates 12 constitute rearward walls of said wheel housings.

Vertical plates 16, one directly at the front of each wheel housing, are welded to intermediate portions of the main channel bars 11 and extend downwardly below said main channel bars to about the elevation of the wheel centers. The vertical plates 16 are in spaced apart relation to each other, their inner edges terminating in planes which are coincident with the inner portions of the wheel housings. Vertical channel bars 17 are welded to intermediate portions of said main channel bars 11 and extend downwardly below the main channel bars. Also, the inner edge of each channel bar 17 is welded to the outer edge of the adjacent vertical plate 16, and the plates 16 and the channel bars 17 are in transverse alinement. The flanges of the channel bars 17 extend rearwardly of the vehicle. The outer flange of each channel bar 17 is disposed vertically and in longitudinal alinement with the flange 13 at the corresponding side of the vehicle, as disclosed. The lower ends of the channel bars 17 may desirably terminate flush with the lower ends of the vertical plates 16. The vertical plate 16 together with the adjacent channel bar 17 in each instance constitutes the forward wall of a wheel housing 15.

A transversely extending channel bar 18 at the front of the wheel housings is disposed horizontally and the opposite end portions of said channel bar 18 are welded to the oppositely disposed vertical plates 16 and channel bars 17, respectively. The horizontal channel bar 18 is at the elevation of the lower portions of plates 16 and channel bars 17, as well as at the elevation of the channel bar 14.

Each wheel housing 15 includes a strong, solid curved bracket, or brackets, 19 welded to a main channel bar 11 and extending downwardly and inwardly, as before mentioned. Also, the rearward portion of each bracket, or brackets, 19 is welded to the vertical plate 12 at the corresponding side of the vehicle frame, and the forward portion of each bracket, or brackets, 19 is welded to the vertical plate 16 at the corresponding side of said vehicle frame. Each curved bracket, or brackets, 19 is integral with, or rigidly supports, a vertical plate 20 extending longitudinally of and integral with the frame, said plates 20 desirably being reinforced as at 21. Each plate 20 in turn supports mechanism for mounting a rear wheel 22 at each side of the vehicle or frame. In the instance of the mounting mechanism for each rear wheel, 23 represents a U-shape bracket welded to an outer surface of the adjacent plate 20 with its horizontal arm at about the elevation of the lower edge of said plate 20 as shown. The U-shape brackets 23 are at the forward ends of the wheel housings, just to the rear of the vertical plates 16. Said U-shape brackets 23 could instead be at the longitudinal centers of the plates 20, in which instance said U-brackets would support mounting mechanism for the vehicle as disclosed in my pending application Serial No. 4,911, for Vehicle and mounting mechanism therefor, filed February 4, 1935.

The lower portion of each vertical plate 20 extends inwardly horizontally, as at 24. A floor 25 at the rear of the vehicle and terminating just forwardly of the rear wheels 22 has its opposite side portions resting upon and welded to the inwardly extending portions 24. A transverse member 26 has its opposite end portions welded to said inwardly extending portions 24. Said member 26 is situated just at the front of the floor 25. A transverse member 27 at the elevation of the transverse member 26 has its opposite end portions welded to vertical angle bars 28 and its length welded to the transverse channel bar 18. Each vertical angle bar 28 is welded to a vertical channel bar 17 and is situated at the forward side of the channel bar to which welded. The floor 25 and the transverse members 26 and 27 constitute, together with the channel bars 14 and 18, the transverse structure hereinbefore mentioned interconnecting the opposite wheel housings 15.

Each U-bracket 23 rigidly supports the forward end portion of a set of leaf springs 29 which extend rearwardly from the U-brackets and longitudinally of the vehicle. In the instance of each set of leaf springs 29, a pair of spaced apart U-bolts 30 have their bases arranged beneath the leaf springs and their legs extending upwardly at the opposite sides of the leaf springs and upwardly through openings in the base of the corresponding U-bracket, and nuts 31 are threaded upon the legs of the U-bolts and turned down against the base of the U-bracket to rigidly clamp the leaf springs to each other and to the U-bracket by which carried.

A wheel carrying member 32 is associated with the rearward end portion of each set of leaf springs 29. Each wheel carrying member 32 may include parallel plates 33 held in spaced apart relation by reinforcing members 34 welded to the plates.

Alined openings in the upper portions of the plates 33 of the different wheel carrying members support shafts 35 for the wheels 22.

Anchor beams, one for each wheel carrying member 32, are represented at 36. Each anchor beam 36 has one of its end portions integral with or rigidly attached to the lower portion of a wheel carrying member 32, as at 37.

The lower forward portion of each wheel carrying member 32 includes a stud 38 extending between and rigid with the parallel plates 33 of said wheel carrying member, and the rearward end portion of each set of leaf springs 29 is curled about the stud 38, as represented at 39, at the corresponding side of the vehicle frame, the arrangement being such that the leaf springs 29 are supported on the wheel carrying members 32 and said wheel carrying members are in turn supported by the wheels.

The end of each anchor beam 36 which is spaced from the wheel carrying member 32 to which the anchor beam is secured, is mounted for universal swinging movement in a bearing 40 rigidly supported by the vehicle frame at the side thereof opposite said wheel carrying member, there being one bearing 40 for each anchor beam. The mounting 40 for each anchor beam 36 may be constituted as a ball and socket joint.

It will be apparent that the rear wheels 22 of the vehicle support the frame through the instrumentality of the leaf springs 29 at the opposite sides of the vehicle, said leaf springs bearing against the studs 38 on the wheel carrying members 32 and being grasped at their opposite, forward end portions and securely held to the U-shape brackets 23 rigid with members of the frame which are in turn rigid with the main channel bars or girders 11 extending longitudinally of the vehicle. That is, the wheel housings 15 are rigid with the main longitudinal girders 11 and the forward end portions of the leaf springs are rigid with the wheel housings. Thus, the weight of the frame is carried to the rear wheels 22 through supporting springs rigidly attached to the frame.

When a rear wheel 22 bobs up and down under the frame, due to flexing of the leaf spring carrying said wheel, the corresponding anchor beam 36 oscillates in its bearing 40 at the opposite side of the frame. When, however, the different sides of the vehicle frame have tendency to bob up and down, to thus have tendency to alter the elevations of the U-shape brackets 23 supporting the opposite leaf springs, the anchor beams perform a load stabilizing service. That is to say, the anchor beams 36 are load stabilizing members adapted to reduce sidewise pitching or rocking or tilting movement of the vehicle frame to a minimum. Suppose one side of the frame of the vehicle to be moved downwardly, due to a vertical thrust at this side, to an extent greater than the opposite side of said frame. This vertical thrust will be imparted as well to the wheel 22 at the corresponding side of the frame and to the end of the anchor beam rigid with the corresponding wheel carrying member, through the instrumentality of the set of leaf springs at this same side of the frame, as will be obvious. The downward vertical movement of one side of the frame will cause the wheel carrying member 32 and the anchor beam 36 rigid therewith to move downwardly as an integral unit, and this downward movement will be imparted to the opposite side of the frame through the instrumentality of said anchor beam, the downward force being applied at the bearing 40, which cannot under such condition allow pivotal movement of the anchor beam because said anchor beam and its pivoted end are actually moved downwardly and not swung relatively to the frame as when the wheels bob up and down under the frame. Or, stated differently, any downward movement at a side of the frame of the vehicle sufficient to move the end of the anchor beam attached at this same side of the frame downwardly with the frame more or less as a unit, will cause resultant downward movement of the opposite side of the frame, through the anchor beam which was moved downwardly, and thus reduce sidewise rocking or tilting movement of the vehicle to a minimum. At the same time, ordinary bobbing of the rear wheels 22 of the vehicle allowing it to continue its course at an approximately even keel or level elevation, is provided for by the leaf springs 29 and the wheel mountings as illustrated and described, affording easy pivotal movement of the anchor beams 36 in response to bobbing of the wheels.

After tendency toward a jolting movement at a side of the frame, a natural rebound occurs to cause this side of the frame to be elevated. Obviously, the wheel carrying member at this same side of the frame has this rebound movement imparted to it, and through the anchor beam rigidly attached to said wheel carrying member the upward reaction is imparted to the opposite side of the frame, in the same general manner as already set forth. Thus, upon tendency of either upward or downward movement of one side of the frame of the vehicle; or tendency of either side toward movement to above or below an approximately level and natural elevation of said frame; there is reaction through the anchor beam rigid with the wheel carrying member or support at one side of the frame and pivoted to the opposite side of the frame to cause said opposite side to move in a like direction tending always to keep the vehicle on an even keel, rocking or tilting toward neither right nor left.

The leaf springs 29 are rather loosely curled about the studs 38, and when the vehicle is under no load, the wheels 22 will be at slightly different angle than when said vehicle is under load. The arrangement is such that when the vehicle is out of use, the wheels 22 slant slightly to the vertical, downwardly and inwardly, due to the fact that the frame and hence the pivoted ends of the anchor beams are at their highest elevation when there is no load. When a load is applied, the frame carries the weight against the leaf springs and moves downwardly slightly. This moves the pivoted ends of the anchor beams downwardly to correspond, and, through the instrumentality of the anchor beams and the wheel supports, swings the wheels to vertical position, as will be understood.

The vehicle 10 could be a semi-trailer propelled in usual manner by a truck or tractor, or could be of any other preferred type.

A tank for liquid, such as oil, is indicated at 41, and the transverse members 26 and 27 constitute supports for the base of said tank. The tank 41 is seated in the vehicle frame between the main channel bars or girders 11 and includes a lower portion above the base of the tank fitted about and resting upon the inner surfaces of the downwardly and inwardly extending wheel housings 15. The rearward portion of the tank could terminate at the rearward portion of the wheel housings, adjacent the vertical plates 12 and the transverse channel bar 14, but for the sake of clearness of elements at the rearward portion of the frame and at and below the elevation of the base of the tank, said tank is illustrated as extending rearwardly of the vehicle only to position in advance of the anchor beams 36.

A conveyor pipe 42 for liquid, such as oil, extends horizontally rearwardly from a lower portion of the tank as illustrated. Said pipe 42 is at the midwidth of the vehicle slightly above the floor 25, and has its forward end attached to the tank, as at 43, to lead liquid from said tank. The rearward end of the pipe 42 is attached to a T-fitting 44 which in turn is attached to horizontally disposed pipes 45, including a pipe 45 extending transversely of the vehicle toward each side thereof. Each pipe 45 includes a manually operable valve 46, and at the outer side of said valve 46 each pipe 45 communicates with and supports a spray device or bar made according to the invention and including a vertical portion 47 attached to a pipe 45 as at 48 and extending downwardly, and a horizontal portion 49 extending transversely of the vehicle at elevation just below the wheel centers as illustrated. Each vertical portion 47 is hollow and is communicated with by a pipe 45, and each horizontal portion 49 is also hollow and is communicated with by the vertical portion to which attached. The horizontal portions 49 may desirably be situated slightly to the rear of the vehicle and in longitudinal alinement with each other. As shown, the adjacent ends of said horizontal portions 49 all but meet. The pipes 45 are as disclosed secured upon the vehicle by means of brackets 50 carried by the transverse channel bar 14.

Each vertical portion 47 is joined to a horizontal portion 49 at location intermediate the ends of the horizontal portion. Said portions 47 and 49 may be joined together at the midlength of the portion 49, or at any other location along the length of said portion 49.

In the transportation of oil or other liquid upon wheel supporting mechanisms incorporating the principles as hereinbefore illustrated and described, there is but little tendency toward causing the liquid to splash over due to any sidewise rocking or tilting of the vehicle. Sidewise surging the liquid is reduced to a minimum. Also, wheel supporting mechanisms of the present character insure that the horizontal portions, such as 49, of spray devices or bars made according to the invention will substantially constantly maintain parallel relation to the surface as a vehicle having said spray devices or bars advances over a highway, it naturally and obviously following that the construction and arrangement precluding rocking and tilting of the frame of the vehicle also precludes rocking and tilting of the horizontal portions 49 carried by said frame.

As disclosed in Figs. 6 and 7, each hollow vertical portion 47 may include a liquid-tight pivotal joint 51 which will allow for relative movement between the vehicle frame and each horizontal portion 49 in a vertical plane extending transversely of the vehicle and longitudinally of the horizontal portion but will preclude all other relative movements between said vehicle frame and the horizontal portions. By balancing the weight of each portion 49 at opposite sides of the corresponding joint 51 to place said portions 49 in horizontal position, said portions 49 will obviously remain horizontal regardless of any rocking or tilting movements of a vehicle carrying the spray devices or bars. Thus, joints such as 51 make provision for maintaining the spray devices or bars of the invention in substantially constant parallel relation to the surface adjacent a vehicle having said spray devices or bars while the vehicle is traveling, regardless of the nature of the mounting means for the vehicle.

As illustrated, each horizontal portion 49 is a closed cylinder or tube having heads 52 upon its opposite ends. Along its length each cylinder or tube is provided with threaded openings 53 in the bottom or lower portion of the cylinder or tube. Said threaded openings 53 are spaced at equal distances apart along the length of each horizontal portion 49.

An externally threaded neck 54 of a nozzle 55 is arranged in each threaded opening 53, and all of the nozzles 55 desirably extend vertically downward from the horizontal portions, cylinders or tubes 49. The nozzles 55 are of similar structure and the lower surfaces of said nozzles all desirably terminate in a single horizontal plane. Each nozzle 55 as disclosed includes a small vertical port 56 leading from the interior of the corresponding horizontal portion, cylinder or tube 49 and merging at its lower end into a vertical outlet 57 at the lower portion of the nozzle. Each outlet 57 may desirably have width about equal to the diameter of a port 56, but the outlets 57 are flared in the direction of their lengths. Or, stated differently, each small vertical port 56 merges into the upper central portion of a vertical flaring outlet for each nozzle defined by opposite parallel side walls 58 adjacent the lower surface of the nozzle and spaced apart at distance about equal to the diameter of a port 56, and end walls 59 which diverge downwardly from the location of the lower end of the port 56 to said lower surface of the nozzle. The diverging walls 59 of the outlets 57 are all in alinement lengthwise of the horizontal portions, cylinders or tubes 49 so that oil or other liquid made to flow from the nozzles is sprayed in a stream having uniform thickness but diverging downwardly in a vertical plane extending transversely of the vehicle. Preferably, the arrangement is such that at location where the diverging stream from each nozzle approaches the earth's surface, it overlaps slightly with the diverging stream from the next adjacent nozzle at each side, as indicated at A in Figs. 3 and 6. It will be seen that all of the nozzles cooperate to evenly distribute oil or other liquid in a stream or path of uniform thickness extending transversely of a highway. Obviously, as a vehicle carrying the novel spray devices or bars advances, the oil or other liquid is uniformly spread over treated areas of the highway.

The precluding of rocking and tilting of the horizontal portions 49 of the spray devices or bars constantly maintains the overlapping relation of the diverging or fan shaped streams or sheets of liquid, as at A, and because of the overlap of the streams or sheets, no uncovered streaks of highway surface result. The diverging of fan shaped streams or sheets are, naturally, thinner at their outer, lower locations, adjacent the ground, and the slight overlap of the streams or sheets makes provision for applying a sheet of substantially uniform thickness across the highway surface.

Thus, the invention provides a spray device or bar, associated with the tank of a vehicle for transporting oil or other liquid, mounted or arranged to have substantially constant parallel relation to a surface over which the vehicle travels and constructed to evenly and uniformly distribute the oil or other liquid over the area of a highway.

What is claimed is:

The combination with a tank vehicle for transporting a liquid, of a horizontally disposed spray device mounted on said vehicle to extend transversely thereof and associated with the tank of the vehicle as a medium for applying liquid to a highway, said spray device being constituted as a hollow bar having equally spaced nozzle outlets in its lower portion and arranged vertically and in longitudinal alinement along the length of the spray bar, each nozzle outlet including means for spraying liquid in a stream of approximately uniform thickness diverging downwardly in direction transversely of the vehicle and longitudinally of the spray device, and said nozzle outlets having such relation to each other and to the earth's surface that adjacent divergent streams emitted from the several nozzle outlets will slightly overlap, and means constituted as a mounting for said vehicle for precluding sidewise swaying of the vehicle and for substantially constantly maintaining the spray device in parallel relation to the surface of a highway while the vehicle is traveling over said highway.

ROY B. SIMNING.